Oct. 9, 1923.

B. HALL 1,470,560

VARIABLE SPEED MECHANISM

Original Filed March 24, 1917  4 Sheets-Sheet 1

Inventor:
Bicknell Hall,

Oct. 9, 1923.

B. HALL 1,470,560

VARIABLE SPEED MECHANISM

Original Filed March 24, 1917  4 Sheets-Sheet 2

Inventor:
Bicknell Hall,
by Emery Booth, Janney Varney
Attys.

Oct. 9, 1923.  
B. HALL  
1,470,560  
VARIABLE SPEED MECHANISM  
Original Filed March 24, 1917   4 Sheets-Sheet 3

Inventor:  
Bicknell Hall,  
by Emery Booth Janney Varney  
Attys.

Oct. 9, 1923.
B. HALL
1,470,560
VARIABLE SPEED MECHANISM
Original Filed March 24, 1917     4 Sheets-Sheet 4
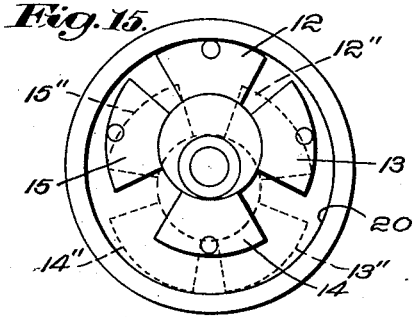
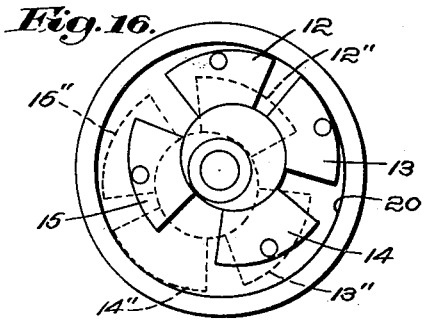
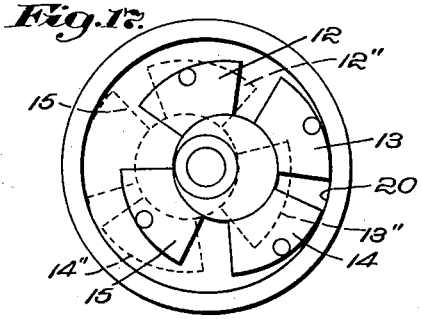
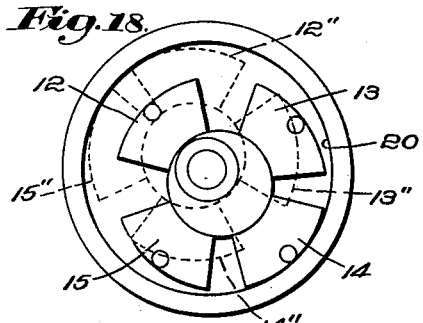
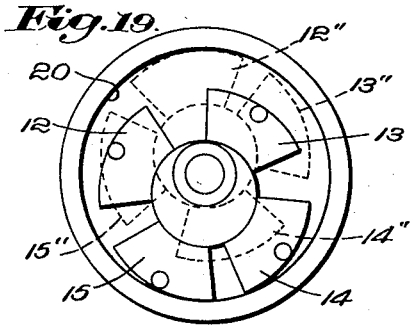
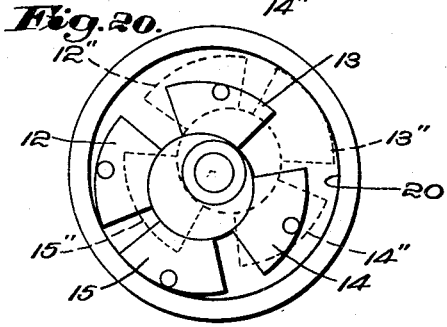
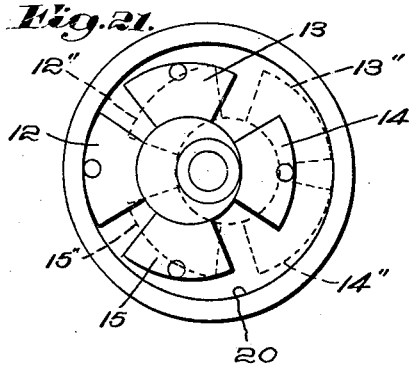
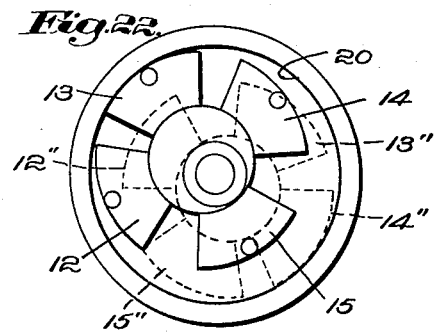
Inventor:
Bicknell Hall.
by Emery, Booth, Janney & Varney
Attys.

Patented Oct. 9, 1923.

1,470,560

UNITED STATES PATENT OFFICE.

BICKNELL HALL, OF ABINGTON, MASSACHUSETTS, ASSIGNOR TO HALL CO., OF BOSTON, MASSACHUSETTS, A CORPORATION OF MASSACHUSETTS.

VARIABLE-SPEED MECHANISM.

Continuation of application Serial No. 157,248, filed March 24, 1917. This application filed September 29, 1917. Serial No. 194,012.

*To all whom it may concern:*

Be it known that I, BICKNELL HALL, a citizen of the United States, and a resident of Abington, in the county of Plymouth and State of Massachusetts, have invented an Improvement in Variable-Speed Mechanism, of which the following description, in connection with the accompanying drawings, is a specification, like characters on the drawings representing like parts.

This application is a continuation of my co-pending application Serial No. 157,248, renewed March 24, 1917, and originally filed February 23, 1911, No. 610,295, and is also in part and as to certain common subject matter a continuation of my application Serial No. 204,100, a renewal of Serial No. 507,616, originally filed July 14, 1909, and with which applications the present application was copending.

This invention relates to variable speed mechanism, the object thereof being to provide an improved, simplified and compact construction. The nature of my invention will best appear from a description of an embodiment thereof selected for illustrative purposes and shown in the accompanying drawings wherein—

Figure 2:
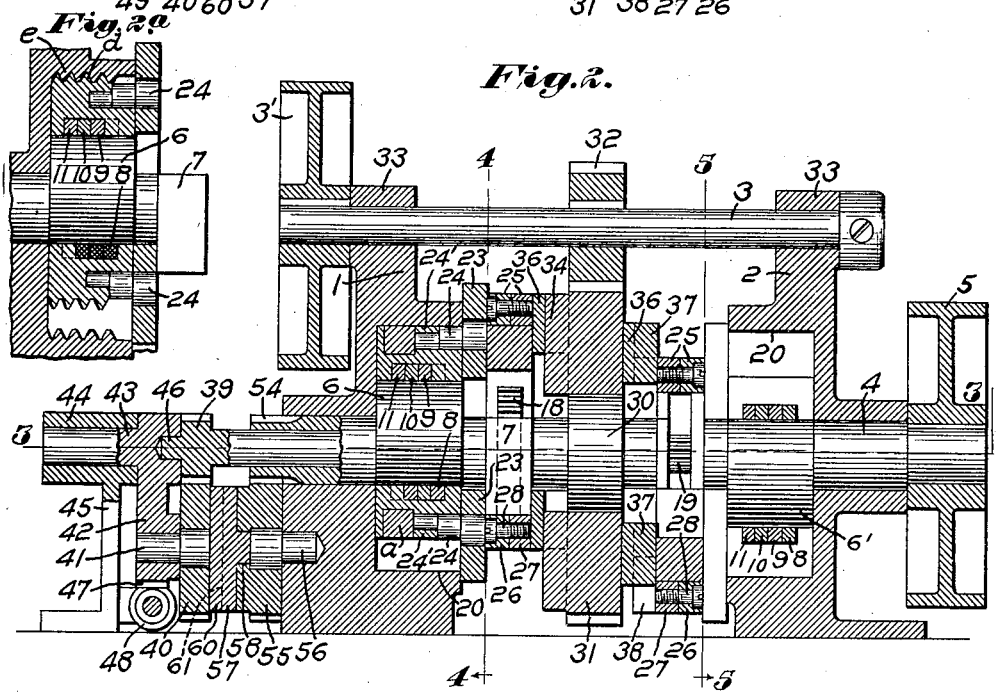
Fig. 2 is a vertical, longitudinal, central section of the mechanism shown in Fig. 1.
Figure 4:
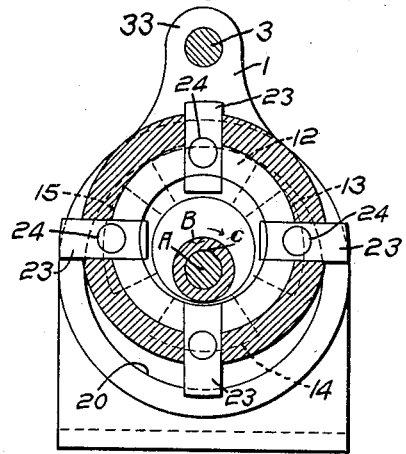
Figure 3:
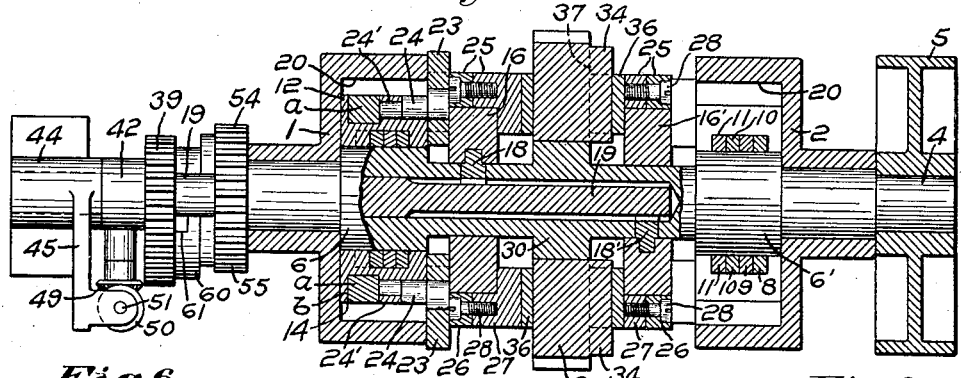

Fig. 2ª is a detail showing a modified form of my invention;

Fig. 3 is a longitudinal, horizontal section taken at right angles to that of Fig. 2 and upon the line 3—3 of said figure;

Fig. 4 is a transverse section upon the line 4—4 of Fig. 2 looking to the left in said figure and representing the relation of one set of segments or gear segments to its adjacent fixed bearing when the adjacent adjustable disk bearing and its transmission ring are eccentric to a greater extent than said fixed bearing.

Figure 5:
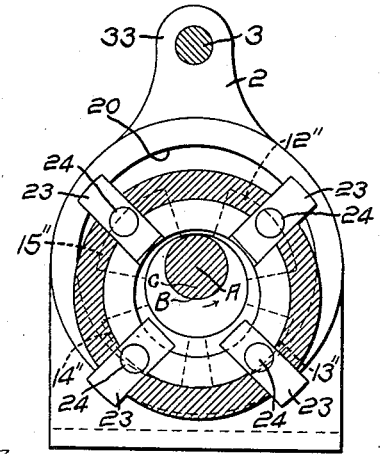
Figure 6:
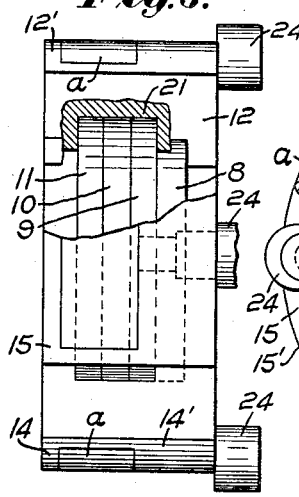
Figure 7:
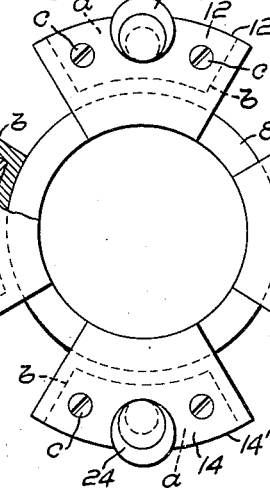
Figure 8:
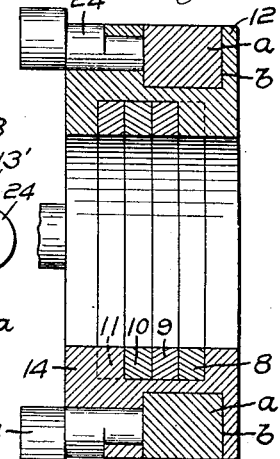

Fig. 5 is a transverse section on the line 5—5 of Fig. 2 looking to the right in said figure and representing the relation of the other set of segments or gear segments to its adjacent fixed bearing when said fixed bearing and adjacent adjustable disk bearing and its transmission ring are arranged with said adjustable bearing eccentric to a greater extent than said fixed bearing;

Fig. 6 is a side elevation with parts broken away of a series of segments or gear segments constituting one set;

Fig. 7 is a face view thereof;

Fig. 8 is a vertical, longitudinal section thereof;

Figure 9:
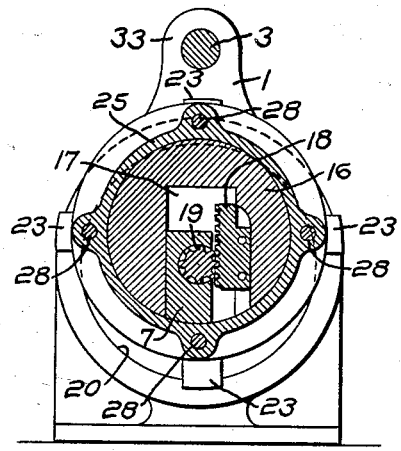
Figure 10:
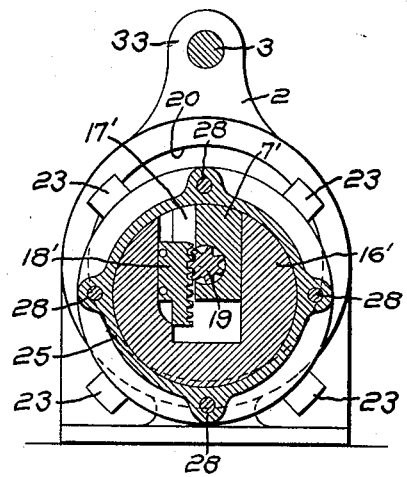
Figure 11:
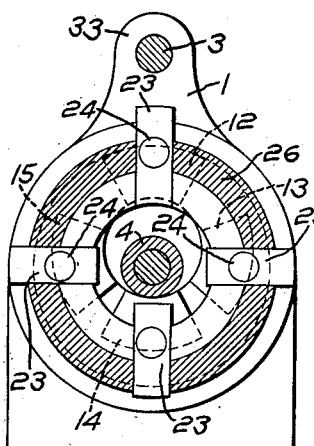

Fig. 9 is a vertical, transverse section taken through one of the adjustable disk bearings and the pinion and rack for adjusting the same;

Fig. 10 is a similar view taken through the other adjustable disk bearing and the pinion and rack for adjusting the same;

Fig. 11 is a transverse section similar to Fig. 4 of the parts, when the fixed disk bearing and adjustable disk bearing and its transmission ring are eccentrically arranged, the adjustable bearing being concentric with shaft 4.

Figure 12:
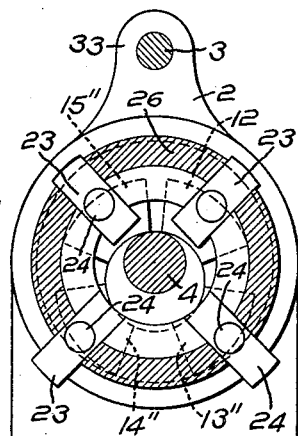

Fig. 12 is a view similar to Fig. 11 of the second set of gear segments;

Figure 13:
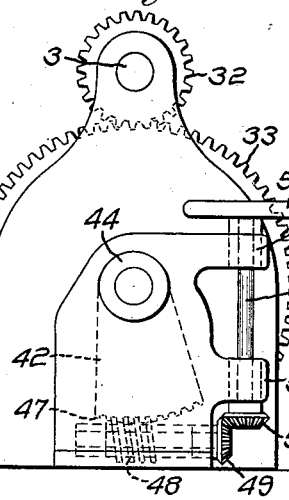
Figure 14:
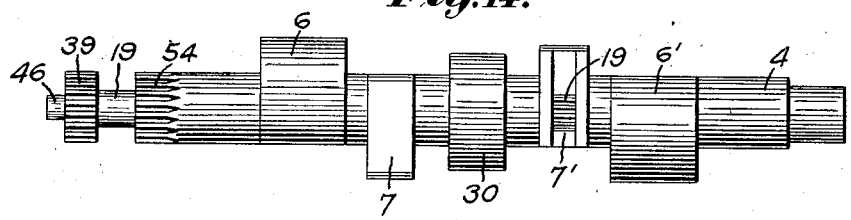

Fig. 13 is an end elevation representing in full and dotted lines one form of means for changing the position of the adjustable disk bearings;

Fig. 14 is a side elevation of the main or drive shaft;

Figs. 15 to 22 inclusive are diagrams representing the path of movement of both the fixed disk bearings and their segments or gear segments, with respect to the internal fixed driving surfaces during a single cycle of said fixed disk bearings, the parts being arranged as in Fig. 4;

Referring first to Figs. 1 to 8 inclusive, upon a suitable base (not shown) are erected two end standards 1, 2 constituting, it may be, a partial casing and here shown as having loosely mounted in the upper part thereof a horizontal shaft 3 having fast thereon a pulley 3' from which power may be taken. If desired, the mechanism may be substantially wholly enclosed. Within bearings in said standards is mounted a drive shaft 4 having keyed thereon a pulley 5 to which power may be applied from any suitable source, whereby the shaft may be driven at a constant speed in one direction. As shown most clearly in Fig. 14, the drive shaft has formed with or fast thereon the circular but eccentric bearings 6, 6' and rectangular seats 7, 7' here shown as oppositely protruding from the shaft, but which may be formed or mounted thereon in any suitable manner. While my invention may be embodied in a construction having a single fixed disk bearing composed of a plurality of parts, a single adjustable disk bearing and related parts to be hereinafter described, preferably I employ a plurality, and in the present embodiment of the invention a pair of each of said bearings and related parts. The rectangular seats 7, 7' are here shown as of opposite eccentricity with respect to the drive shaft 4 to provide a running balance. Inasmuch as in this embodiment of the invention various parts are duplicated, it will be necessary to describe in detail but one set of parts excepting in so far as it is essential to make clear the different circumferential positions of certain of the members of said set of parts. I shall describe in detail the parts shown at the left in Fig. 3 and in detail in Figs. 6, 7 and 8.

Loosely mounted upon the circular bearing 6 is a series of segments or gear segments or segmental members herein numbered 12, 13, 14, 15 and shown in this embodiment of my invention as having smooth or friction driving surfaces, the efficiency whereof may be augmented if desired by the employment of fiber or other plugs $a$ set into sockets $b$ in the driving faces of the said segments or gear segments and therein confined by screws $c$ or otherwise. If desired and as shown in Fig. 2ª, the said segments may be roughened or similarly formed, as by providing them with saw teeth $d$ formed as alternate circumferential ridges and grooves to engage with a similar circumferentially extending ridge and groove formation $e$ upon the surface with which they periodically engage. These segments or gear segments are each provided or formed with rings numbered respectively 8, 9, 10, 11, which are directly and loosely seated upon the said bearing 6. In other words, each segment is composed of the gear segment portion and its hub or ring that is seated upon the bearing 6, and whereby said segments are slidably supported for angular movement relatively to the shaft and bearings 6, 6'.

Upon the rectangular seat 7, as shown most clearly in Fig. 9, is positioned a slotted disk bearing 16, the diametral slot 17 thereof being of such length as to permit the shifting of the disk bearing 16 so as to vary its eccentricity with reference to the drive shaft 4. While any suitable means may be employed to vary the eccentricity thereof, preferably I form with or attach to one of the walls of the slot 17 a rack 18 meshing with an elongated pinion 19 mounted within the drive shaft 4, which for that purpose is made hollow for a portion of its length as represented in Fig. 3. Inasmuch as the eccentricity of the segments 12, 13, 14 and 15 and their rings 8, 9, 10 and 11 is unchangeable, I shall herein term the part 6 whereon they are mounted the fixed disk bearing, and as the eccentricity of the slotted bearing 16 may be varied or eliminated as desired, I shall term the same the adjustable disk bearing.

Surrounding the segments or gear segments 12, 13, 14, 15 and the fixed disk bearing whereon they are loosely mounted and formed integrally if desired with the standard 1, is an annular portion or member having an annular surface 20 herein shown as an internal engaging surface upon and against which said segments are adapted to drive, and the standard 2 is preferably similarly formed to furnish a corresponding annular portion or member having an annular surface 20 to cooperate with the other set of segments or gear segments.

The said segments or gear segments or members 12, 13, 14 or 15 are each of any suitable circumferential extent and their hub or ring portions 8, 9, 10 and 11 are preferably nested together as most clearly shown in Figs. 6 and 8 for simplicity and compactness of construction; that is to say, the hub or ring portion of the segment 12 is at its upper part circumferentially recessed, as indicated at 21, to receive parts of the hubs or rings 9, 10 and 11 of the segments 13, 14, 15; the ring 10 is circumferentially and oppositely recessed to receive parts of the rings 8, 9, 11; and the other rings 9, 11 are correspondingly shaped at points diametrally opposed to each other, so that each ring receives a portion of the three other rings or such other number of rings of its set as may be employed. This arrangement is adopted for simplicity and compactness of construction, but it is to be understood that any other suitable constuction may be employed and that the number of segments or members may be varied as found desirable. The ring portions 8, 9, 10, 11 of the segments 12, 13, 14 and 15 are loose upon the bearing 6, so as to be moved circumferentially thereon when the eccentricity of the adjacent adjustable disk bearing is varied. Herein, I have shown the segments 12, 13, 14 and 15 as friction gears; that is to say, they are transmission gears, preferably devoid of teeth, but acting as transmission gears by reason of engagement of their preferably smooth surfaces 12', 13', 14', 15', with the preferably smooth internal surface 20 constituting a reactance element. For this reason immediately upon being brought into contact with said internal surface 20, they assume a cooperating relation with regard thereto.

Each of the said segments 12, 13, 14, 15 is provided with a pin 24 extending longitudinally of the drive shaft 4 and seated in sockets 24' in the faces of the said segments. Upon each of said pins is rotatably mounted a block 23. As indicated in Fig.

3, these blocks are applied to the faces of the segments adjacent the inner face of the standard 1 so as to form an annular series. The said blocks 23 may be shifted from time to time as hereinafter more fully described in varying the eccentricity of the adjacent adjustable eccentric bearing 16.

Loose upon the adjustable eccentric bearing 16 is a transmission ring 25 herein represented as made in two parts, 26, 27 for convenience in assembling. If desired, these parts may be provided with outer flanges overlapping the adjustable disk bearing 16. The two parts 26, 27 of the said transmission ring are suitably secured together by means of screws 28. That portion of the transmission ring 25 that is positioned next the segments 12, 13, 14 and 15 and their ring portions 8, 9, 10, 11 is provided upon its face adjacent said segments with a suitable and corresponding number of radial grooves 29, which in this embodiment of my invention are four in number and are positioned at right angles to each other, the end of one of said grooves being shown in Fig. 1 and the other grooves being formed with relation thereto as indicated. Within each of said grooves is arranged the appropriate block 23 of one of the segments 12, 13, 14, 15.

The drive shaft 4 as shown in Figs. 2, 3 and 14 is provided with a circular hub 30, loose whereon is a gear or member 31 herein termed the driven element and from which power may be conveyed in any suitable manner, as by means of a pinion 32 meshing therewith and fast upon the shaft 3 loosely mounted in suitable bearings 33—33 in the standards 1, 2 and provided with the fast pulley 3' from which power may be taken. If desired, the member 31 may be connected by direct belting to a pulley, or power may be taken in any other suitable manner from the gear or member 31.

Positioned between the driven gear 31 and transmission ring 25 is a so-called unison ring 36. As represented most clearly in Figs. 1, 2, 3, the faces of the gear or member 31 adjacent each unison ring 36 are provided with diametral ribs 34, said ribs upon opposite faces being preferably at right angles to each other. In the adjacent face of each unison ring 36 is a diametral groove 35 shown most clearly in Fig. 1.

The face of each unison ring that is adjacent its companion transmission ring 25 is provided with a groove 38, and the adjacent face of each transmission ring is provided with a lug 37 engaging therewith. The lugs and grooves upon the two pairs of unison rings and transmission rings are preferably arranged at right angles to each other. In this manner circumferential movement is conveyed from each transmission ring 25 to its unison ring 36 and from the unison rings 36 to the driven gear or member 31.

Instead of the unison ring, or rings, I may employ any suitable means for conveying movement from the transmission ring to the driven element 31, provided such means conveys movement uniformly; that is, provided such movement does not alter or vary in transmission the speed of movement imparted to it by the transmission ring, which imparted speed of movement varies with each adjustment of the adjustable disk bearing.

I have thus far described the preferred construction of parts involving the one set of elements or that shown in Fig. 3 at the left of the driven gear 31. The construction of parts making up the second set of elements or that shown in Fig. 3, at the right of the driven gear 31, when the second set of elements is employed may be, and preferably is, substantially identical with that already described.

Figure 1:
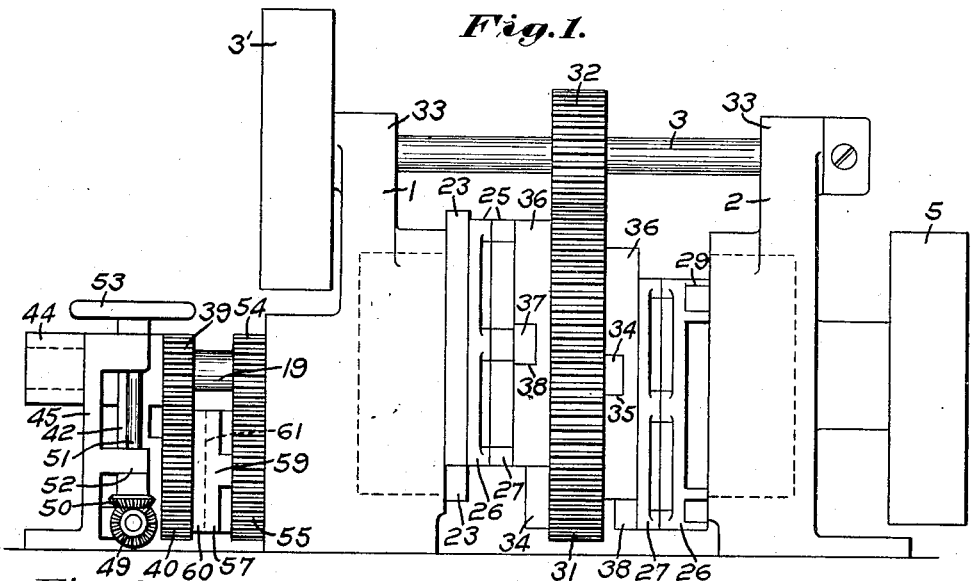
Fig. 1 is a side elevation of a speed varying mechanism embodying my invention.

In Fig. 4, I have represented the segments or members 12, 13, 14, 15 of the first set of elements viewing Fig. 3, and it will be noted that in the position of parts represented in Figs. 4 and 5, the segments 12, 13, 14, 15 are arranged respectively at an angle of 45° to the gear segments 12'', 13'', 14'', 15'' of the second or right hand set of said segments viewing Fig. 3. In the embodiment of the invention herein shown the diametral groove in the opposite or right hand face of the driven gear 31 is at right angles to that shown in the left hand face, and consequently the diametral groove on the adjacent face of the right hand transmission ring is shown in this embodiment of the invention as at right angles to that shown in the left hand transmission ring. This construction is not, however, necessary, but is preferably employed in that embodiment of the invention here illustrated. The grooves 29 in the outer face of the right hand transmission ring for the reception of the blocks 23 of the transmission gears 12'', 13'', 14'', 15'', are respectively at an angle of 45° to the similar grooves 29 in the face of the left hand transmission ring 25 as indicated in Fig. 1. It will be understood that the number of grooves in the several parts and their angular arrangement will be varied in different embodiments of my invention in accordace with the number of segments or gear segments employed.

Having reference first to Fig. 4, it will be apparent that when the shaft 4 is rotated clockwise, the segments 12, 13, 14, 15 will gyrate about said shaft 4 in the manner of an eccentric strap. Said segments consecutively and frictionally engage with a driving engagement the adjacent internal friction or preferably smooth surface 20. The said segments together with their ring portions roll about the said internal surface 20, the said segments being in frictional engagement therewith, and if said segments together provided an uninterrupted driving surface, the latter would constantly frictionally engage the said internal friction surface 20. Inasmuch, however, as the said segments 12, 13, 14, 15 are preferably spaced substantially as shown and as neither set of said segments in itself makes a complete or uninterrupted gear or driving member, it is apparent that the said sets of segments or gear segments intermittently and consecutively engage the said internal friction surface 20. Inasmuch as the shaft 4 is rotated clockwise as indicated by the arrow in Fig. 4, each gear 12, 13, 14, 15 as it engages with the adjacent friction surface 20 will be driven contraclockwise as indicated by the arrow adjacent the segmental gear 12 in Fig. 4. This movement of the gear segments 12, 13, 14, 15 contraclockwise is imparted by the pins and blocks 23, 24 of said segments or gear segments to the transmission ring 25 and thence through the unison ring 36 or other suitable connections to the driven gear 31 or other driven element, thereby driving the same in a direction opposite to that of the direction of movement of the drive shaft 4. It is, of course, evident that the drive shaft 4 may be rotated in either direction, the driven gear 31 being thereby rotated in an opposite direction in that relation of the parts thus far described.

Viewing Fig. 4, it will be noted that in this embodiment of the invention the segments, members or gear segments 12, 13, 14 15 and 12″, 13″, 14″, 15″ are complementally arranged with respect to each other, so that the two sets of segments or gear segments together constitute substantially a complete or uninterrupted driving member or gear. As previously stated, the segments 12, 13, 14, 15 pertaining to one of the fixed disk bearings are each of a fixed or unvarying eccentricity. The eccentricity of the disk bearing 16 may be made equal to that of the fixed disk bearing, or it may differ therefrom to any extent within the limits imposed by the capacity for adjustment of the said disk 16, being made greater or less than the same as desired. Within the scope of my invention the disk 16 may be adjusted to any desired extent, thus varying its eccentricity to any desired degree. If the adjustable disk 16 be so positioned upon its seat that it is of the same eccentricity as the fixed disk bearing carrying the segments 12, 13, 14, 15, then the adjacent transmission ring 25 is of the same eccentricity as the said fixed disk bearing and upon rotation of the drive shaft 4 in either direction, the said segments 12, 13, 14, 15 roll about within that part of the standard 1 having the internal friction surface 20 and in driving engagement or contact therewith, but with the consequent reverse rotation of the said segments or gear segments and consequently with the reverse rotation of the driven gear or member 31 at a speed which is the same as that at which the said gear 31 would be driven were the said eight segments 12, 13, 14, 15, 12″, 13″, 14″, 15″ assembled in fixed relation to constitute a single complete gear rolling about and in frictional engagement with the internal surfaces 20. If the eccentricity of the disk 16 exceeds that of the fixed disk bearing carrying the segments 12, 13, 14, 15, then the speed of the gear 31 is increased over that just referred to, and if it be less than that of the said segments 12, 13, 14, 15, then the speed of the gear or member 31 is less than that above indicated.

In Fig. 4 the center of rotation of the shaft 4 is indicated at A while the center of the fixed disk bearing for the segments 12, 13, 14, 15 is indicated at C and of the adjustable disk bearing and the transmission ring 25 is indicated at B, the eccentricity of the latter exceeding that of the fixed disk bearing. The several segments 12, 13, 14, 15 are so related to each other that axial lines drawn through their blocks 23, which blocks are swingable about their pins 24, intersect at the center B of the adjustable disk bearing 16 with the previously stated result of driving the gear 31 at a speed in excess of that which would be obtained by rolling a gear composed of the segments herein illustrated in fixed relation within and engaging the adjacent surface 20 and with the same eccentricity as that of the fixed disk bearing. Such eccentricity may be varied by moving the slotted disk bearing 16, viewing Fig. 9, outward from the axis of the shaft 4 to obtain a still greater speed of the gear 31 or inward toward the axis of said shaft, this inward movement being of any desired extent within the capacity of the mechanism to obtain the desired diminution of speed of the driven gear 31.

As, however, the eccentricity of the adjustable disk bearing 16 is made different from that of the fixed disk bearing carrying the segments 12, 13, 14, 15, by moving the former toward the axis of the shaft 4, that is, toward the point A in Fig. 4, the result is to enforce a new position of the transmission ring 25, the unison ring 36 adapting itself to any position of adjustment. The adjustment of the disk bearing 16 and consequently of the transmission ring 25 compels a repositioning of the segments 12, 13, 14, 15, as indicated for example in Fig. 11. in which the adjustable disk bearing is shown moved into concentricity with the shaft 4. This repositioning of the segmental gears is due to the fact that the movement of the transmission ring 25 toward the axis of the shaft 4 enforces a similar inward movement of the blocks 23 and their studs toward the axis of said shaft; that is, of such blocks and studs as do not occupy a vertical position.

The positioning of the adjustable disk bearing 16 so as to change its ecentricity with respect to that of the segments 12, 13, 14, 15 carried upon the fixed disk bearing, institutes a secondary or neutralizing gyration of said adjustable disk bearing 16, which neutralizes to a greater or less extent that of the still continuing primary gyration of the fixed disk bearing, the extent of the neutralization being dependent upon the extent of change in position of the adjustable disk bearing 16, the result being a rotation of the driven gear 31 still in the reverse direction to that of the drive shaft 4 but at a different speed with respect to that obtained when the eccentric disk bearnig 16 and the segments 12, 13, 14, 15 are of the same eccentricity. The nearer the adjustable disk bearing 16 be moved toward concentricity with the center of rotation A of the drive shaft 4,—that is, the less its own gyration,—the greater will be the neutralizing effect of the said secondary gyration,—that is, of the adjustable disk bearing 16,—and hence the less will be the resultant rate of rotation of the driven gear 31, but still in a direction the reverse of that of shaft 4, or in other words, the less will be the rate of rotation of the transmission ring 25. The greater the difference between the primary and secondary gyrations the greater the change of speed of the driven gear 31 with respect to the drive shaft 4. If the adjustable disk bearing 16 be moved until it is in concentricity with the center of rotation of the drive shaft 4, then the gyration of the disk bearing 16 wholly ceases, and therefore said disk wholly neutralizes the main or primary gyration of the fixed disk bearing, on which is mounted the segments 12, 13, 14, 15, because of the now existing difference between the movement of the fixed and adjustable disk bearings, thereby causing the main drive shaft 4 to rotate without any driving effect upon the gear or member 31. If this adjustment of the disk bearing 16 be continued in the same direction until the center of the transmission ring 25 is shifted to the other side of the axis of the drive shaft 4 from that shown in the drawings, then there is instituted a secondary gyration, which is not a neutralization of but is supplemental to the main or primary gyration of the fixed disk bearing, with the result that the gear 31 is now driven in the same direction as the driving shaft 4, but at a speed dependent upon the amount of such secondary and now supplementary gyration. The speed of rotation of the gear or member 31 in the same direction as that of the drive shaft 4 is dependent merely upon the extent of adjustment of the disk bearing 16, or in other words, the extent of adjustment of the center of the transmission ring 25 to the other side of the axis of the shaft 4 may be as great as desired. Thus my invention contemplates the reverse driving of the gear or member 31 at any speed, and the forward driving of said gear or member at any speed with adjustment of the parts to effect any intermediate speed of said gear or member 31 in either direction.

In Fig. 4, I have illustrated the position of the segments or gear segments 12, 13, 14, 15 at one position of adjustment of the disk bearing 16, the segment 12 being then in frictional driving engagement with the fixed internal friction surface 20, with the resultant movement of the said segment 12 contraclockwise. The continued rotation of the drive shaft 4 clockwise rolls the said segments 12, 13, 14, 15 and their ring portions 8, 9, 10, 11 about within the said surface 20, and during such movement of the shaft 4 the said segments 12, 13, 14, 15 come consecutively into frictional driving contact with the said internal friction surface 20, thereby compelling continued rotation of the gear or member 31.

From an inspection of diagrams 15 to 22 inclusive, it will be apparent that upon the described rotation of the shaft 4 in a clockwise direction, as the segment 12 moves from its position of engagement with the internal friction surface 20, as illustrated in Figs. 4 and 15, the segment 14″ is brought into frictional or driving engagement with the other internal friction surface 20 (Fig. 16), and that as it in turn is withdrawn from such engagement, the segment 13 is brought into engagement (Fig. 17), this action being continued with other segments, in the order shown. The result is an engagement with the friction surfaces 20 of one or more of all the segments at all times, the said segments being of such extent that before one is withdrawn from such engagement another is brought thereinto. The employment of segments permits the true rolling action of the successive members into and out of engagement with the fixed internal friction surfaces 20 in the standards 1, 2.

Comparing Figs. 11, 12, it will be evident that whatever be the adjusted eccentricity of the bearing disks 16, 16′, the resultant positions of the segments 12, 13, 14, 15, 12″, 13″, 14″, 15″, are such that one of said gear segments is constantly in frictional driving contact with one or the other of the internal frictional surfaces 20, thereby compelling a constant rotation of the driven gear 31. After a segment is rolled out of engagement with its internal frictional surface 20, its subsequent position is immaterial until it is again brought into driving engagement with its said frictional surface. It matters not that in certain positions of adjustment a segment or member of each set is in driving engagement with its internal friction surface 20 at the same time, nor that in certain positions of adjustment all segments of one set or the other be spaced a greater distance apart than in other positions of adjustment, for whatever be the positions of adjustment the gap between adjacent segments of one set is always bridged by a segment of the opposite set, thereby compelling continuous rotation of said driven gear or member 31.

In said Figs. 15 to 22 inclusive, the successive positions of the segments or members 12, 13, 14, 15 are indicated in full lines and the successive positions of the segments or members 12″, 13″, 14″, 15″ are indicated in dotted lines.

From the foregoing description, it will be understood that the segments, members or gear segments of both sets always travel in the same gyratory path with relation to the fixed disk bearings 6, 6′, inasmuch as they are provided with rings or hubs 8, 9, 10, 11 loosely mounted upon the fixed disk bearings 6, 6′. During such gyratory movement, they roll around within and in frictional driving engagement of the frictional internal surfaces 20. The speed of rotation of the shaft and eccentrics is always the same, and when the adjustable eccentrics 16, 16′ are of the same eccentricity as the fixed eccentrics, then, as previously stated, the resulting speed of the driven gear or member 31 equals that derived from complete gears rolling within and in frictional engagement with the said internal frictional surfaces 20. By altering the eccentricity of the said adjustable disk bearings 16, 16′ however, the circular path of movement of the centers of the said adjustable disk bearings 16, 16′ is increased or decreased in diameter according as the eccentricity of said disks is increased or diminished. If the circular path of movement of the centers of the eccentrics 16 and 16′ equals that of the centers of the segments 12, 13, 14, 15 and 12″, 13″, 14″, 15″, then, as stated, the resulting speed is that of complete gears rolling in frictional driving engagement with the fixed internal frictional surfaces 20, but if the circular path of the centers of the eccentric 16, 16′ exceeds that of the centers of the segments 12, 13, 14, 15, 12″, 13″, 14″, 15″, the resulting speed is more, and if the disk 16, 16′ be brought in concentricity with the shaft 4 the circular path of the centers of the said disk 16, 16′ is reduced to a point or disappears, with the result that no driving movement is imparted by the said disks 16, 16′ to the gear or member 31.

Viewing Figs. 9 and 10, it will be evident that the eccentric disks 16, 16′ are oppositely positioned upon the shaft 4 to provide a running balance and that the slot 17 in said disk 16 is represented in Fig. 9 as opening downwardly, whereas the slot 17′ in the disk 16′ is represented in Fig. 10 as opening upwardly. While said eccentrics may be similarly or otherwise positioned, I prefer the opposite positioning herein illustrated, as it affords a more effective balancing of the parts in operation.

The pinion or pinions 19 may be rotated in any suitable manner to adjust the eccentric disk bearings 16, 16′; that is, to vary their eccentricity. Herein as shown in Fig. 3, a single elongated pinion 19 is employed to adjust both disk bearings 16, 16′. In order rotatively to adjust said pinion 19, I have herein represented it as having formed therewith on its outer end a pinion 39, as shown most clearly in Fig. 2, meshing with a gear 40 loose upon a stud 41 carried by a gear segment 42, the upper end whereof has an angularly extending stud 43 mounted in a bearing 44 in a suitable standard 45. The end 46 of said pinion 39 is shown as extending into said gear segment 42 coaxially with the pivotal stud 43 of the latter. The lower end of said gear segment 42 is provided with teeth 47 meshing with a horizontally positioned worm 48 upon the outer end whereof is a bevelled pinion 49 meshing with a similar pinion 50 on a short shaft 51 mounted in bearings 52 of the frame and having at its upper end an adjusting hand wheel 53. The drive shaft 4 has upon the end thereof opposite the pulley 5 a circumferential series of teeth 54 with which mesh the teeth of a gear 55 loose upon a stud 56 mounted in the standard 1. Between the gear 55 and the gear 40 is a unison or other transmission ring 57 generally similar to the unison rings 36 in Fig. 3. The gear 55 is provided with a diametral groove 58 to receive a corresponding rib 59 (Fig. 2) upon the unison ring 57 and the opposite face of said unison ring is provided with a diametral rib 60 preferably positioned at right angles to the rib 59 to enter the corresponding groove 61 of the gear 40. The pinions 39 and 54 are of the same size and normally rotate together and at the same speed, since the elongated pinion 19 is within and rotating with the shaft 4 carrying pinion 54. Also the gears 40 and 55 are of the same size and are normally idly driven about their own axes and at the same speed by the pinions 39 and 54.

When it is desired to adjust the pinion 19 so as to change the eccentricity of the eccentrics 16, 16′, the gear segment 42 is swung in an arc about its stud 43 as a pivot, through the worm 48, by means of the hand wheel 53. This arcuate movement of the segment 42 compels a bodily movement of the gear 40 carried thereby, about the center of said gear segment, and of the pinion 39, said movement permitted by the unison ring 57.

Said gear 40 constantly meshes with said pinion 39 and is constantly rotating therewith at a speed proportional to that of said pinion and also at the same speed as that of gear 55 with which it is connected through said unison ring. Said bodily movement of gear 40, which latter is prevented from turning relatively to the gear 55 by said unison ring, therefore gives to the pinion 39, fast on elongated pinion 19, a relative movement in one direction or the other, the said pinion 19 thereby being angularly adjusted within and relatively to the shaft 4 in one direction or the other depending upon the direction of turning of the handwheel 53, worm 48 and segment 42. Said relative movement of the elongated pinion 19 moves the racks 18, 18' thereby to adjust the adjustable eccentric bearings 16, 16'. From the foregoing it will be clear that said adjustment may be made while the transmission mechanism is in operation, or while stationary, it being unnecessary to interrupt the turning of shaft 4 to make any desired shift in speed transmitted.

In the device illustrated herein the driving belt is applied to the driving pulley 5, which, with its shaft 4 and eccentric bearings 6, 6' and 16, 16' transmit rotary motion to and through the other parts of the device, hence said driving pulley, its shaft, and said eccentric bearings may together be considered as the driving element, or any one of them might be so considered, upon the understanding that the effective axis is that which transmits motion to the straps 25 and the gear 31. Said effective axis is a resultant of the fixed eccentricity of the bearings 6 and 6' and the adjustable eccentricity of the bearings 16, 16' as heretofore described and is adjustable as to its path of movement according to the adjustment of said bearings 16, 16'. In other words, the effective axis of the driving member or group of members constituting what I have herein referred to as the driving element of the device, is the gyrating axis about which are grouped the pins 24 of the segments, a resultant of the relative adjustment of the axes of the eccentric bearings, which latter are upon, driven by and together determine the effective axis of the driving element of the device.

In the device illustrated, power is taken from the rings or straps 25, through the unison rings 36 and the gear 31, and said members, together or separately, may be considered the driven element of the device. The axes of said rings or straps 25, constituting driven elements and of the driving element heretofore mentioned are adjustable into positions of greater or less relative eccentricity.

Operatively interposed between the driving and driven elements are the groups of segments or members having segmentally shaped and segmentally effective driving or movement-imposing portions 12—15 and 12'' to 15'' having arcuate engagement or driving surfaces and which serve to transmit motion and power from the driving element to the driven element. Each such segment together with its respective and herein integral ring portion 8 to 11, block 23 and pin 24 constitute one form of what may conveniently be termed a driving unit for transmitting motion from the driving to the driven elements. The driving units of each group are herein distributed in a single plane about the axes of the driving and driven elements and are operatively connected with one of said elements, herein the driving element, in a crank-like manner, that is to say, the driving units are moved by the drive shaft and eccentrics and the connections therewith in the manner of a crank to impart movement to the rings 25, which crank furnishes the connection between said driving element and the driving unit or units.

With the eccentric bearings 16 or 16' adjusted into any eccentric position differing from that of the unadjustable eccentric bearings 6, 6' the outer portion of each driving unit where the curved surface of a segment engages the annular member having the herein internal engaging or engagement surface 20, makes intermittent engagement with said surface, and the points of such intermittent engagement change or are adjustable around the circumference thereof since at each succeeding engagement each of said units engages a new portion of said surface 20 of the annular member more or less removed from that or those previously engaged, the points of engagement progressing around the said surface 20 in steps determined as to the period, spacing, or rapidity of engagement according to the extent of relative eccentricity above mentioned.

In engaging and disengaging from said driving surface each driving unit approaches and recedes therefrom in a rolling manner, that is to say, the action is such that the two members, so to speak, roll together and away from each other; not only is the action of meeting and receding thereby made easy and susceptible of ready and effective guiding but the period of effective driving contact or engagement between the same may thereby be prolonged. Such engagement and disengagement of the effective driving parts relieves the same of unnecessary frictional engagement between successive points of intermittent engagement and renders also the adjustment of the transmission from one to another speed more easy, mechanical and efficient. Thus, while the engagement is intermittent, it varies in duration according to the relative eccentricity of the axes of the driving element and the driven elements 25 and accordingly varying the transmission obtained thereby or therefrom.

Each of the segmentally shaped members or driving units in its movement toward and from its engaged element moves in an endless path until the limit of movement is reached where it moves directly radially in a straight line, as stated, and whatever its movement, whether in a straight line or in an endless path the driving units, at their effective driving portions, approach and recede from the engaged element in a general direction that is substantially normal to that element in the region of that engagement. With relation to said approach and recession therefore, the engaged face or surface 20 may be termed an abutment face although the line of thrust thereon may not be substantially normal to it.

Where the driving units and engaged elements are not provided with gear teeth, as in the present instance, an adjustment in speed due to adjustment of the axes of the driving element and of the driven elements 25 into positions of greater or less eccentricity is obtained which may be carried uninterruptedly through any intermediate speed from minimum to the maximum and without steps between the various ranges of speeds. In other words the rolling contact of the driving units and the engaged surface is universally adjustable circumferentially of and upon said surface, giving a condition of universal speed adjustment. As herein shown said points of contact or engagement are not only adjustable universally and circumferentially about the axis of the annular member having the surface 20, as in my said copending application Serial No. 507,616, filed July 14, 1909, but the driving units may make such contact or engagement at any point circumferentially upon said surface.

As already observed, the points of engagement of the driving units with the engaged element shift variably around the latter according to the extent of relative eccentricity of the eccentric bearings, and according to the radial position of the driving units relative to the driven rings 25; as the said relative eccentricity is varied said radial position of the engaging unit is also varied, causing an accompanying variation in the speed transmitted.

In the present instance it will be noted that during the periods of actual disengagement between the segmental members and the element engaged thereby, said segmental members are positively held or guided by their respective slidable ring portions 8 to 11. Thus said driving units and the annular member having the surface 20 whether actually engaged or for the time being disengaged, are always in juxtaposition where they may readily be guided into the next engagement by suitable means as described.

It will be evident from the foregoing description that in accordance with the present embodiment of my invention I may from a drive shaft constantly rotated in one direction, obtain any desired speed in either direction of a driven gear or member, segmental members preferably being employed in effecting this result.

Having thus described one illustrative embodiment of my invention, I desire it to be understood that although specific terms are employed, they are used in a generic and descriptive sense and not for purposes of limitation, the scope of the invention being set forth in the following claims.

Claims:

1. Speed varying mechanism comprising in combination, operatively connected driving and driven elements, said connections including one or more interposed rotatable and variably gyratory members connected with said driven element, means variably to gyrate said member or members, a plurality of cooperating segments provided with driving surfaces, said segments being operatively associated with said member or members and with the driving element, and one or more relatively stationary elements having a surface with which said segments are engageable to rotate said gyratory member or members while gyrating.

2. Speed varying mechanism comprising in combination concentric driving and ultimately driven elements, an interposed gyratory member rotatable with said driven element, one or more segments having driving surfaces, said segments being operatively connected to said member, means with which said segments are engageable to cause relative angular movement between said segments and the driving element, means upon the driving element to effect said engagement and mechanism to vary the radius of gyration of said gyratory member.

3. Speed varying mechanism comprising in combination driving and driven elements, the former including a drive shaft, a series of segments circumferentially arranged about said shaft, a reactance member with which said segments are engageable, means driven by said shaft to vary the radial position of one or more of said segments with respect to said shaft and said reactance member, and operative connections between said segments and said driven element.

4. Speed varying mechanism comprising in combination, a drive shaft, a normally stationary annular element concentric with said shaft, a gyratable and also rotatable member, means upon said shaft to gyrate said member, and a circumferential series of intermittently effective engaging members engageable with said stationary element at any point circumferentially of the same and operatively connected with said shaft and with said gyratable member whereby said member is forced to rotate about its own axis when caused to gyrate.

5. In transmission mechanism for converting constant rotary to variable speed rotary motion, the combination of a drive shaft, a circumferential series of segmental members, and fixed and adjustable gyratory means conjointly supporting and positioning said segmental members about and upon said shaft.

6. Speed varying mechanism comprising in combination driving and driven elements, the former including a drive shaft, fixed and adjustable transmission members thereon, and friction-drive means interposed between and operatively connected to said members.

7. Speed varying mechanism comprising in combination driving and driven elements, the former including a drive shaft, fixed and adjustable gyratory transmission members mounted thereon, one of said members being connected with said driven element, segmental driving means having driving surfaces, said means being interposed between and operatively connected to said transmission members, and an annular member having an engagement surface with which said segmental means is universally engageable circumferentially.

8. Speed varying mechanism comprising in combination a drive shaft, driving and driven elements thereon, fixed and adjustable transmission members upon said shaft, and friction drive means operatively connecting said transmission members and said driven element.

9. Speed varying mechanism comprising in combination a drive shaft, driving and driven elements respectively fast and loose thereon, and gyratory, friction-drive, segmental transmission means between and operatively connected to said driving and driven elements.

10. Speed varying mechanism comprising in combination a drive shaft, driving and driven elements respectively fast and loose thereon, primary and secondary gyratory transmission members respectively connected with said driving and driven elements, cooperating means intermediate and operatively connected with said transmission members and having engagement surfaces, and a reactance element with which said surfaces are engageable to communicate motion from the driving to the driven element.

11. Speed varying mechanism comprising in combination driving and driven elements, the former including a drive shaft, segments having engagement surfaces supported by and angularly movable about said shaft and operatively connected to said driven element, a co operating normally stationary engagement surface, means to gyrate said segments about said shaft and into and out of engagement with said surface, and means to cause said angular movement of the segments about said shaft.

12. Speed varying mechanism comprising in combination driving and driven elements, the former including a drive shaft, a gyratory member thereon, means having arcuate engagement surfaces carried by said gyratory member and circumferentially movable thereon, mechanism including a reactance element to vary the circumferential relation of said means and said gyratory member, and driving connections between said means and said driven element.

13. Speed varying mechanism comprising in combination driving and driven elements, the former including fixed and adjustable, gyratory transmission members, means conjointly supported and positioned by said transmission members, a reactance element with which said means is engageable, and a unison ring between one of said transmission members and said driven element.

14. Speed varying mechanism comprising in combination driving and driven elements, the former including a drive shaft, a series of segmental members provided with a circumferentially extending alternate rib and groove formation, said segmental members being supported about said drive shaft, a member having a correspondingly formed internal engagement surface, means cooperating with said drive shaft to roll said segmental members within and in engaging relation to said surface, and controlling connections between said segmental members and said driven element.

15. Speed varying mechanism comprising in combination driving and driven elements, the former including a drive shaft, one or more segmental members carried thereby, means including connections between said segmental members and said driven element to vary the radial position of said segments with respect to said shaft, a member having an annular surface with which said segmental members are engageable, said connections between said segmental members and driven element being effective to cause rotation of said element during engagement of said segmental members with said annular surface.

16. Speed varying mechanism comprising in combination driving and driven elements, the former including a drive shaft, gyratory members thereon and of fixed and variable eccentricity respectively, a fixed member having an internal engagement surface, means drivingly engageable with said surface, said means being adapted to be moved by said gyratory members conjointly and when in engagement with said surface to cause rotation of one of said gyratory members, and operative connections between said last named gyratory member and the driven element.

17. Speed varying mechanism comprising in combination a drive shaft, a driven element, and gyratory, friction-drive connections between said drive shaft and said driven element, adjustable to drive the latter at a greater or less or equal speed with respect to said drive shaft and in either direction.

18. Speed varying mechanism comprising in combination a drive shaft, a driven element thereon, gyratory members upon said shaft and of fixed and variable eccentricity respectively, and friction-drive connections between said members and said driven element.

19. Speed varying mechanism comprising in combination operatively connected rotatable driving and driven elements, said connections including an interposed gyratory member rotatable on its own axis and operatively connected with said driven element, cooperating segmental members connected with said gyratory member, and means periodically to restrain one or more of said segmental members from movement, and thereby to compel rotary movement of said gyratory member.

20. Speed varying mechanism comprising in combination operatively connected driving and driven elements, an interposed gyratory member, segments, and means operatively related to said gyratory member, and radially movable with respect to said segments to compel rotation of said driven element.

21. A speed varying mchanism comprising in combination operatively connected driving and driven elements, said connections including an interposed gyratory and rotatable member having driving connection with said driven element and means to gyrate said gyratory member, a series of segments connected with said gyratory and rotatable member, a fixed member against which the segments may be gripped in turn, and means to grip at least one of said segments against said member while releasing other segments therefrom, and thereby to compel rotary movement of said gyratory member to drive said driven element.

22. Speed varying mechanism comprising in combination, driving and driven elements, the former including a drive shaft, a series of segments loosely mounted about said shaft, a member having an internal surface with which said segments are engageable, means to vary the radial position of one or more of said segments with respect to said drive shaft to produce intermittent, sequential engagement of said segments and said member, and a gyratory and rotatable member connected with said segments and with said driven element and rotated by said segments when their position is so varied radially into engagement with said member having the internal surface.

23. Speed varying mechanism comprising in combination driving and driven elements, the former including a drive shaft, fixed and adjustable gyratory transmission members thereon, driving connections between one of said members and said driven element, a reactance element and segments interposed between and operatively connected to said members, and intermittently engageable with said reactance element.

24. Speed varying mechanism comprising in combination driving and driven elements, the former including a drive shaft, fixed and adjustable gyratory transmission members thereon, driving connections between one of said members and said driven element, an annular member having an internal surface provided with a circumferential alternate rib and groove formation, a series of correspondingly formed segments shiftable with respect to said drive shaft and interposed between and operatively connected to said members and intermittently engageable with said surface of said annular member.

25. Speed varying mechanism comprising in combination driving and driven elements, the former including a drive shaft, a series of segments eccentrically carried thereby and shiftable relatively thereto, a stationary member having an internal surface with which said segments engage and gyratory means actuated by said drive shaft and adapted to be rotated by said segments and connected with said driven element to rotate the same.

26. Speed varying mechanism comprising in combination, driving and driven elements, the former including a drive shaft and means interposed between and constituting the operative connections between said elements, said operative connections including a rotatable gyratory member connected to said driven element, a plurality of segmental members connected to said gyratory member and each having a driving surface, a stationary member with which said segmental members are adapted each periodically to engage, and means upon said drive shaft to cause said segmental members periodically to engage said stationary member whereby movement is imparted to said segmental members and thence to said driven element.

27. Speed varying mechanism comprising in combination, operatively connected driving and driven elements, and means interposed between and constituting the operative connection between said elements, said means including two gyratory members only one of which is rotatable upon its own axis, said rotatable gyratory member being connected to said driven element, a plurality of cooperating segments having driving surfaces carried by one of said members and connected with the other, and a stationary member having a surface with which the driving surfaces of said segments are adapted to engage for the purpose of imparting movement to said segments and thence through said rotatable gyratory member to said driven element.

28. Speed varying mechanism comprising in combination, operatively connected driving and driven elements, a plurality of interposed gyratory members, gear means operable during movement of the parts, for adjusting the extent of gyratory movement of one of said members, a circumferential series of segmental members provided with driving surfaces operatively related to and movable by said members, a member with which said segmental members are engageable, and means interposed between said segmental members and the driven element to drive the latter from said segmental members.

29. Speed varying mechanism comprising in combination driving and driven elements, the former including a drive shaft, fixed and adjustable transmission members upon said shaft, operative connections between said members themselves including a circumferential series of segments slidably supported upon one of said members and a ring loose upon the other of said members, said segments having both pivoted and sliding connection with said ring, a surrounding annular member with the inner surface of which said segments are adapted intermittently to engage, and operative connections between said ring and said driven element.

30. Speed varying mechanism comprising in combination a drive shaft, driving and driven elements respectively fast and loose thereon, said driving element including an eccentric transmission member upon said shaft, gyratory segmental transmission means circumferentially movable upon said transmission member and operatively connected to said driven element, means to vary the path of movement of said segmental means, and a member with which said segmental means is intermittently engageable to rotate the latter while gyrating.

31. Speed varying mechanism comprising in combination a drive shaft, driving and driven elements respectively fast and loose thereon, said driving element including primary and secondary gyratory transmission members of fixed and adjustable eccentricity respectively, a series of segments circumferentially movable upon one of said members, means connecting said segments and said driven element for rotation in unison, said means also operatively associating said segments and the other of said members, and an annular member with which said segments are intermittently engageable to cause them to rotate while gyrating.

32. Speed varying mechanism comprising in combination driving and driven elements, the former including a drive shaft, a gyratory member thereon, a series of segmentally shaped driving units supported for angular movement about the axis of said gyratory member, an annular member with which said units have intermittent rolling engagement, the points of said engagement being universally adjustable circumferentially about the axis of said annular member, driving connections between said segmentally shaped units and said driven element and means to vary the radial position of said units relative to the axis of said driven element.

33. Speed varying mechanism comprising in combination driving and driven elements, the former including a pair of gyratory members in lateral alignment, a series of segmentally shaped driving units supported for angular movement about the axis of one of said members and positionable thereon by the other of said members, an annular member with which said units are adapted for intermittent rolling engagement, said engagement of units and annular member being relatively adjustable universally in a circle about the axis of said annular member, driving connections between said segmentally shaped units and said driven element, and means to vary the eccentricity of the other of said gyratory members thereby to vary the radial position of said units relative to the axis of said driven element.

34. Variable speed transmission means comprising in combination rotatable driving and driven elements, means relatively to adjust the axes of said elements into positions of greater or less eccentricity, segmentally shaped driving units distributed about the axes of said elements, each such unit operatively connected with one of said elements, an annular member having an internal driving surface with which said units have circumferentially adjustable, rolling, driving engagement, means to impart to said driving units and said annular member relative movement of approach into and recession from effective driving engagement, and operative connections between said units and the other of said elements.

35. Variable speed transmission means comprising in combination rotatable driving and driven elements, means relatively to adjust the axes of said elements into positions of greater or less eccentricity, segmentally shaped driving units distributed about the axes of said elements, each such unit operatively connected with one of said elements, an annular member having an internal surface with which said units have rolling, driving engagement universally adjustable in a circumferential direction, means to impart relative movement in an endless path to said driving units and said annular member during which movement said driving units progressively approach and recede from effective driving engagement with said surface, and actuating connections between said units and the other of said elements.

36. Variable speed transmission means comprising in combination an operatively associated train of elements including rotatable driving and driven elements, means relatively to adjust the axes of said driving and driven elements into positions of greater or less eccentricity, segmentally shaped driving units distributed about the axes of said last named elements, each such unit operatively connected with one of said elements and having intermittent rolling engagement with another element of said train, the points of said engagement being circumferentially adjustable universally about the axis of said element, and means to impart relative movement in an endless path to said driving units and said elements during which movement said driving units progressively approach and recede from effective driving engagement with said engaged element in a direction substantially normal to the latter in the region of engagement.

37. Variable speed transmission means comprising in combination rotatable driving and driven elements, means relatively to adjust the axes of said elements into positions of greater or less eccentricity, segmentally shaped driving units distributed about the axes of said elements, each such unit operatively connected with one of said elements, an annular member having an internal engaging surface with which said units have intermittent circumferentially adjustable rolling engagement, and means to impart to each driving unit and its engaged element relative movement of approach into and recession from effective driving engagement, the points of engagement shifting progressively around said engaged element in steps dependent upon the eccentricity of said axes.

38. Variable speed transmission means comprising in combination an operatively associated train of elements, including rotatable driving and ultimately driven elements and an annular member having an internal engaging surface; one of said elements having a movement-imposing portion adjustable relative to the other elements into positions of greater or less eccentricity; segmentally shaped driving units distributed about the axis of said driving element and included in said train, each such driving unit having crank-like connection with one of said elements and having intermittently effective driving engagement with and progressively around said annular member, and means to impart successively to each driving unit intermittent movement of approach into and recession from effective driving engagement with its said engaged element in a direction substantially normal to the latter in the region of engagement, successive intermittent engagements of each driving unit with its said engaged element shifting around the latter by steps dependent upon said relative eccentricity.

39. Variable speed transmission means comprising in combination rotatable driving and driven elements; means relatively to adjust the axes of said elements into positions of greater or less eccentricity; segmentally shaped driving units distributed in a single plane about the axes of said elements, each such unit having crank-like connection with one of said elements, an annular member with which said units have circumferentially adjustable, rolling engagement, means to impart to said driving units and the engaged element relative movement of approach into and recession from effective driving engagement, and means operatively connecting said units and the other of said elements.

40. Variable speed transmission mechanism comprising in combination a drive shaft, a bearing thereon and adjustable to be concentric or variably eccentric relative thereto, a gyratory element rotatable upon said bearing, a stationary element having an internal surface concentric with said shaft, and means actuated by said drive shaft including a circumferential series of universally engageable driving members operatively related to said stationary element and said gyratory element to cause rotation of said gyratory element simultaneously with and consequent upon its gyration and at a speed dependent upon the extent of eccentricity thereof.

41. Variable speed transmission mechanism comprising in combination a drive shaft, an element adjustably supported for gyration thereby and rotatable relatively thereto, means operable during rotation of said shaft to effect said adjustment, a stationary element having a surface concentric with said shaft, and means including a circumferential series of universally engageable driving members operatively related to said stationary element and said gyratory element to cause rotation of said gyratory element simultaneously with and consequent upon its gyration.

42. Variable speed transmission mechanism comprising in combination a rotary driving element, a gyratory driven element rotatable about an axis variable into positions of greater or less eccentricity with respect to the axis of said driving element, means to gyrate said driven element, gear means operable during rotation of said driving element to vary said axis of rotation of said gyratory element, an annular member concentric with said driving element, and a series of driving members actuated by said driving element and connected with said gyratory driven element and sequentially engageable with said annular member in any eccentric position of said gyratory driven element thereby to impart rotation to said gyratory driven element simultaneous with and consequent upon the gyratory movement thereof and at a speed dependent upon the extent of eccentricity of the same.

43. Variable speed transmission mechanism comprising in combination a rotary driving element, an element operatively connected to said driving element for gyratory movement about the axis thereof and also rotatable about an axis variably eccentric to said axis of gyration, an annular member having an internal engaging surface of uniform diameter concentric with said driving element, a series of circumferential driving members actuated by said driving element and connected to said gyratory element and having sequential functioning engagement with said annular member to impart rotation to said gyratory element simultaneous with and consequent upon the gyratory movement thereof and at a speed dependent upon the extent of eccentricity of its axis of rotation.

In testimony whereof, I have signed my name to this specification.

BICKNELL HALL.